W. H. CASTER.
SELF LOCKING DRILL CHUCK.
APPLICATION FILED DEC. 19, 1910.

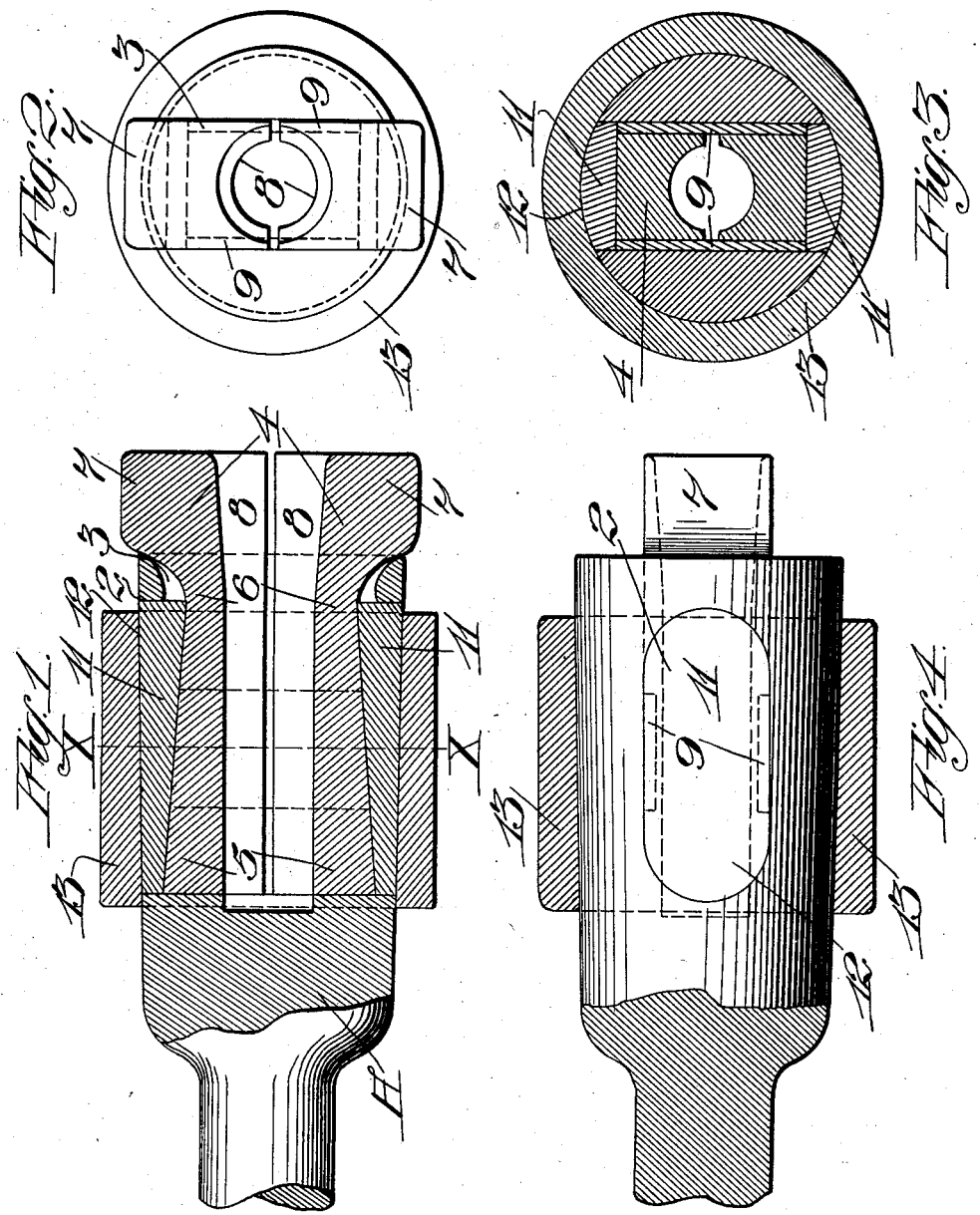

1,023,067.

Patented Apr. 9, 1912.
2 SHEETS—SHEET 2.

UNITED STATES PATENT OFFICE.

WILLIAM HOUGHTON CASTER, OF ANGELS CAMP, CALIFORNIA, ASSIGNOR TO D. D. DEMAREST CO., OF SAN FRANCISCO, CALIFORNIA, A CORPORATION OF CALIFORNIA.

SELF-LOCKING DRILL-CHUCK.

1,023,067. Specification of Letters Patent. Patented Apr. 9, 1912.

Application filed December 19, 1910. Serial No. 598,024.

*To all whom it may concern:*

Be it known that I, WILLIAM H. CASTER, citizen of the United States, residing at Angels Camp, in the county of Calaveras and State of California, have invented new and useful Improvements in Self-Locking Drill-Chucks, of which the following is a specification.

This invention relates to drill chucks, and particularly pertains to self-locking chucks.

It is the object of my invention to provide a simple, powerful, reliable chuck for drills and other tools; to provide a chuck involving a combination of elements coacting to form a self-locking chuck and a self-centering chuck; and also to provide a chuck designed to be easily and quickly dismantled and re-assembled and in which the possibility of the working loose of the parts is overcome.

The invention consists of the parts and the combination and construction of parts as hereinafter more fully described and claimed, having reference to the accompanying drawings, in which—

Figure 5:
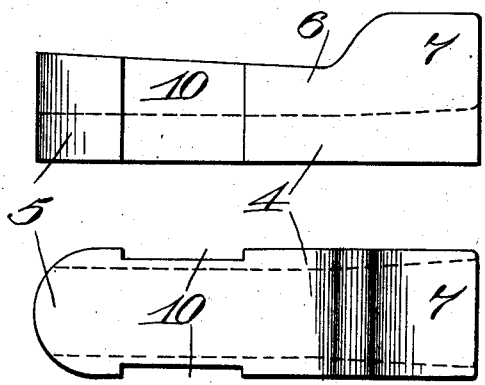
Figure 6:
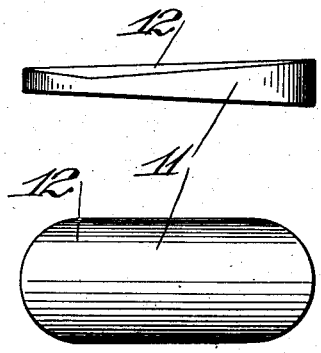
Figure 7:
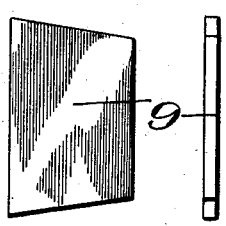
Figure 8:
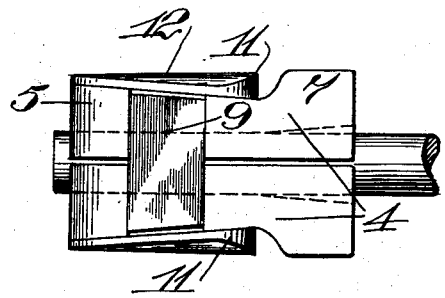

Figure 1 is a central longitudinal section through the chuck. Fig. 2 is an end view of the same. Fig. 3 is a transverse section on line X—X, Fig. 1. Fig. 4 is a plan view showing partly in elevation and partly in section the chuck head and showing the locking ring in section, the locking plates being shown in dotted lines. Fig. 5 is a detail view of the chuck gib. Fig. 6 is a detail view of the chuck wedges. Fig. 7 is a detail view of the chuck locking plates. Fig. 8 is an assembled view of the chuck gibs, wedges and locking plate.

In the illustrated embodiment of my invention A represents the head of the piston of a drill tapering outwardly toward its end, and recessed or slotted through its center to form a substantially oblong chamber 2, which is shown here as having rounded end walls, and the outer end of the head A is slotted to form an opening communicating as at 3 with the chamber formed by the slot 2.

As clearly shown in Fig. 1, the width and length of the end opening 3 are such as to admit of the insertion of a pair of suitably shaped chuck gibs 4 when these are placed face to face so that their inner ends as 5 will just pass in lengthwise through the opening 3 in the end of the shank A. The gibs 4 are made relatively contracted to form a neck-portion 6 and an outer enlarged head-portion 7, on each of the gibs 4, and the gibs are also formed with a central concaved drill clutching seat 8, which when the gibs are placed face to face form a substantial circle for the reception of a circular drill, and the seats 8 may be made of any cross-sectional outline as when it is desired to use hexagonal, octagonal or other shaped drills.

After the tapered gibs 4 have been inserted into the socket chamber 2, suitable locking plates 9, shown in Fig. 7, are adapted to be inserted between the side walls of the chamber 2 and recesses 10 formed on each side of the chuck gibs 4, to prevent the independent movement longitudinally, of the gibs relative to each other. After the locking plates 9 have been inserted to lock the gibs in place, there may be inserted upon the upper tapered faces of the gibs suitably shaped wedges 11, having a contour substantially conforming to that of the transverse slot 2 in the shank A. These wedges of which there is one on each side of the chuck, are tapered on one side to seat upon the chuck gibs 4, and when seated in the shank A their exterior surface, as 12, is substantially flush with the exterior of the head A, so that a lock-ring 13 may be passed over the exterior of the head A, so as to entirely embrace the chuck wedges 11, and prevent their removal from the recesses in the head A.

In operation and assembling of the chuck the two coöperative and interchangeable gibs 4 are placed face to face upon one another and the end 5 is passed into the bore of the head A longitudinally through the opening 3 in the end thereof and the drill shank to be clasped is then passed into the seat 8 between the gibs, thus slightly expanding them and the plates 9 which are inserted loose into the recess 10, preventing one gib sliding on the other. The wedges 11 are then placed upon the tapered surfaces of the gibs 4, which are exposed through the oblong slot 2 so that the thicker ends of the wedges 11 are adjacent the end of the head A, and over the neck 6 of the gibs. The lock ring 13 is then passed over the assembled chuck, thus binding the wedges 11 and the gibs 4 which in turn embrace the drill in the socket.

By this construction of a chuck the drill is positively centered between the faces of the gibs 4, and during the reciprocation of the piston the gibs 4 automatically lock themselves upon the embraced drill, due to the momentum of the chuck, so that there is a tendency on the part of the gibs to advance and be pressed downwardly by the wedges 11 until the friction of the opposed wedges results in a firm grip by the gibs 4 upon the drill shanks.

The locking collar or ring 13 is bored with a taper adapted to fit upon the tapered shank A, and when driven forward along the shank firmly depresses the wedges 11 upon the chuck jaws 4 and during the operation of the drill the momentum of the locking collar 13 is constantly effective to bind the parts together.

Having thus described my invention, what I claim and desire to secure by Letters Patent is—

1. A drill chuck comprising a head having a socket, a pair of complementary interchangeable drill clutching gibs having tapered backs, said gibs adapted to have a limited endwise movement in the socket, tapered wedges mounted in the head and engaging the tapered backs of the gibs, and a ring closely fitting the head and binding the wedges in place between the gibs and ring, said head and ring having corresponding engaging tapered surfaces.

2. A drill chuck comprising a suitable body member transversely chambered with an opening having its greater length parallel to the axis of the body and having a mouth in the end diametrically across the same communicating with said chamber, a pair of complementary interchangeable drill clutching gibs with tapered backs, means effective upon the gibs to close them on a drill shank, said means comprising wedges acting on the tapered backs of said gibs and a locking ring closely fitting the head and binding the wedges in place between itself and the gibs.

3. A drill chuck comprising a head provided with a diametrical slot extending therefrom and having a socket intersecting the slot, a pair of coöperative interchangeable drill-embracing gibs in the socket, wedge members engaging said gibs, means for locking the gibs against longitudinal movement relatively, said means comprising locking plates between the sides of the gibs and the side walls of the slot, said gibs having recesses in their sides to receive said plates, and a locking ring engaging the wedges and binding the gibs upon the drill to be clutched.

In testimony whereof I have hereunto set my hand in the presence of two subscribing witnesses.

WILLIAM HOUGHTON CASTER.

Witnesses:
   DANIEL E. HOLMES,
   WILLIAM H. NICHOLLS.

---

Copies of this patent may be obtained for five cents each, by addressing the "Commissioner of Patents. Washington, D. C."